Jan. 6, 1953        G. C. DETLEFSEN        2,624,364
DIVERTER VALVE
Filed Nov. 17, 1950        2 SHEETS—SHEET 2
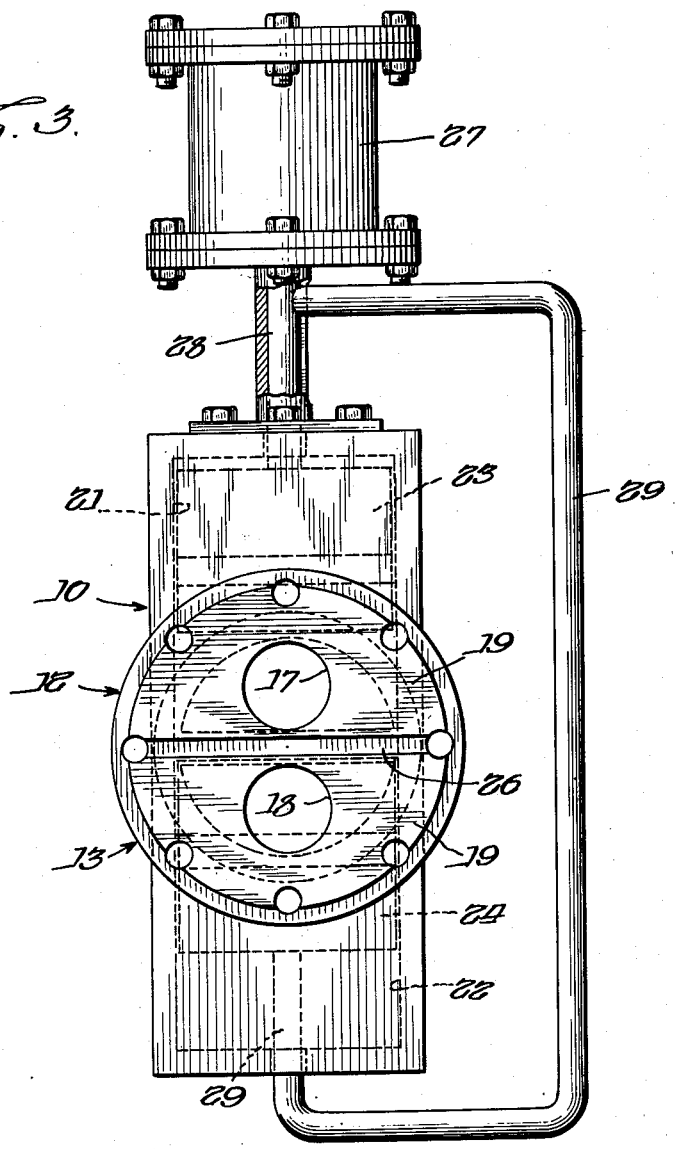
Inventor.
Gustav C. Detlefsen
By Joseph O. Lange
Atty.

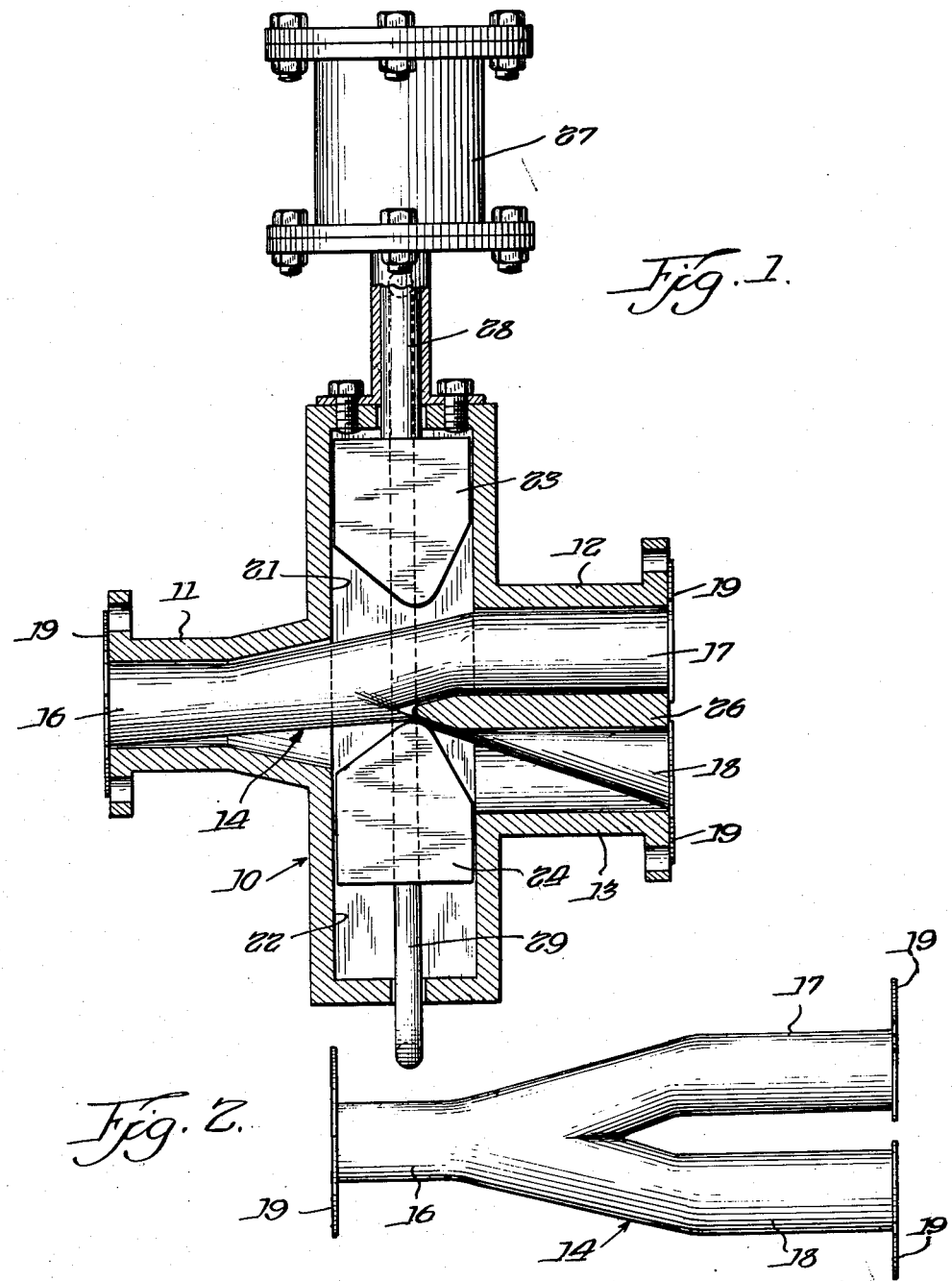

Patented Jan. 6, 1953

2,624,364

UNITED STATES PATENT OFFICE 2,624,364

DIVERTER VALVE

Gustav C. Detlefsen, Chicago, Ill., assignor to Crane Co., Chicago, Ill., a corporation of Illinois Application November 17, 1950, Serial No. 196,283

5 Claims. (Cl. 137—609)

1

This invention pertains to a diverter valve, and, more particularly, it pertains to a multiple outlet type of valve suitable for diverting flow therethrough selectively into a plurality of valve outlets.

It is, therefore, an important object of this invention to provide a valve useful in the diversion of flow of materials preferably from a single valve inlet to a plurality of valve outlets.

Another object is to provide a novel pinch valve construction having a single inlet wherefrom line flow can be selectively directed into one of two valve outlets. The valve depending upon the installation involved may be either lined or unlined as hereinafter referred to in greater detail.

Other objects and advantages will become more readily apparent upon proceeding with the following description read in light of the accompanying drawings, in which, Fig. 1 is a sectional assembly view of a preferred embodiment of this invention.

Fig. 2 is a view of the internal valve liner shown in the assembly of Fig. 1.

Fig. 3 is an end elevation exterior view of the invention shown in Fig. 1.

Similar reference numerals refer to similar parts throughout the several views.

At the outset, in order to appreciate the true merit of this invention, the following brief description will show a desirable application of this invention to a piping system, preferably consisting of a main line and branch lines. One of many structures suitable for employing this invention could be of a pneumatic conveyor, such as that shown in U. S. patent application, Serial No. 125,712, filed November 5, 1949. In the use of the above mentioned piping system in conjunction with the pneumatic conveyor blowing or carrying foundry sand or the like, it will be desirable to have a plurality of branch lines connected to a main pipe line. Thus, material flow therein can be easily diverted into a selected branch line and directed to a branch station, or the material can be allowed to continue to flow through the main line as desired. It will thus be apparent that a relatively simple and completely enclosed piping system may be employed in a simple and economical manner to selectively distribute sand from a central point of preparation to a desired number of stations throughout a foundry.

Specifically, describing this invention, as shown in Fig. 1, a two-way pinch valve comprising a valve body or casing 10 is preferably provided with an inlet 11 and dual outlets 12 and 13.

2

The ends of the valve body are shown flanged for purposes of connecting pipe lines (not shown) to the inlet and the outlets.

An important additional feature of this invention is the preferable location of a flexible liner 14 fitted within the valve body 10 to further form or define the said outlets 12 and 13. As best shown in Fig. 2, the liner 14 is preferably of a Y-shaped tubular construction having a single inlet section 16 and the dual outlet sections 17 and 18 to conform to the similar sections of the valve casing 10. The ends 19 of the liner 14 are preferably flanged at end limits, as indicated, for the purpose of being secured between the previously mentioned valve body flanged ends and the connecting pipe (not shown). With this construction, it is clear that the flanged ends 19 may also serve as gaskets at the aforementioned joints.

As further shown in Fig. 1, two oppositely disposed substantially central chamber portions 21 and 22 of the valve body 10 are suitably formed in axial alignment to receive the reciprocally movable closure members or blocks 23 and 24, respectively, whereby the latter members can be selectively positioned transversely to the liner 14 and thereby abut the same to pinch or cut off the liner outlet passages 17 or 18. In the valve position in Fig. 1, the outlet passage 18 is shown as being pinched or cut off while the inlet passage 16 and the outlet passages 17 form one continuous passage.

It should be noted that an interior valve body anvil-like partition 26 extends across the valve outlet section to provide an abutment for the liner in the valve closing or pinching operation of the blocks 23 and 24 and in the securing of the liner flanged outlet ends 19. The above mentioned construction is shown in Figs. 1 and 3.

The actuating means for operating blocks 23 and 24 may readily comprise numerous conventional arrangements. The example thereof is shown in Figs. 1 and 3, in which a two-way air cylinder 27 is shown bolted to the valve body 10 and having a piston rod 28 connected to blocks 23 and 24. Block 23 is shown in Fig. 1 to be directly connected with the piston rod, while Fig. 3 shows that block 24 is connected thereto through an intermediate rod 29 which is attached to the piston rod and the block 24.

It should thus be apparent that the blocks 23 and 24 are arranged to be raised and lowered together, thereby singly positioning each adjacent the liner 14 to pinch the respective branches of the same against the partition 26. Thus, a simple and convenient means of diverting flow of material through a piping system has been achieved.

Obviously, as a modification within the spirit of the disclosure, it could be arranged that the outlet branches 17 and 18 of the liner 14 can be pinched by the respective blocks 23 and 24 either simultaneously to close the valve completely, or else singly to close either passage 17 or 18 selectively as desired. The important feature of the construction is that a main pipe line is established from which a branch line can be conveniently separated to readily permit the flow of material through either or both pipe lines. It is wholly within this inventive concept to also eliminate the liner 14, thereby having the blocks 23 and 24 solely serve to interrupt flow through the valve outlet passages 12 and 13.

Although this invention has been described in specific forms, this is merely for purpose of illustration, and it should not be so limited, as it is susceptible to numerous changes within the spirit of this invention and the scope of the appended claims.

I claim:

1. A valve comprising a valve body having an inlet and a plurality of outlets, a flexible liner having branches disposed within said valve body defining the junction between said body inlet and each of said outlets, reciprocally movable means mounted within said valve body for transversely flexing said liner selectively thereby to interrupt flow through said outlet at the junction between the said inlet and outlets in a plurality of planes.

2. A valve comprising a valve body having an inlet and a pair of outlets, a flexible liner disposed within said body with openings coinciding with said inlets and outlets, a closure member having a plurality of seat portions mounted to cooperate with each of said outlets to selectively pinch said liner on oppositely disposed peripheral portions thereof and thereby interrupt flow therethrough, and means for selectively actuating said closure member transversely across said outlets.

3. A valve comprising a valve body having an inlet and a pair of outlets in different planes in superposed relation, the said body having a partition separating said outlets, a flexible Y-shaped tubular liner disposed within said valve body to form the interior of the said inlet and outlets of the valve body, a pair of oppositely disposed closure members mounted within said valve to be movable transversely relative to said liner thereby to selectively pinch the outlets of the latter member against the said partition in the end limit of inward movement of the closure members, and means for reciprocally moving said closure members.

4. A valve comprising a valve body having an inlet and a pair of outlets in substantial alignment, the said body having a partition separating said outlets, the said partition extending substantially parallel to the line of fluid flow in said inlet and outlets, a flexible Y-shaped tubular liner disposed within said valve body to form the interior of the said inlet and outlets of the valve body, a pair of interconnected oppositely disposed reciprocally movable closure members guided within said valve body to bear against the said liner and thereby selectively deflect portions of the outlets of the latter member against oppositely disposed edges of the said partition at either end limit of inward movement of the closure members, and means on at least one of the closure members for actuating the said closure members.

5. A valve comprising a valve body having an inlet and a pair of outlets in substantial alignment, the said body having a partition separating said outlets, the partition having its inner end limit defined by a pair of oppositely disposed inclined edges, a flexible Y-shaped tubular liner disposed within said valve body to form the interior of the said inlet and outlets of the valve and enclose the inclined edges of the partition, a pair of oppositely disposed spaced apart plunger members guided within said valve and arranged to be reciprocally movably transversely to the said liner, the plunger members having medium surfaces in the spaced-apart area to selectively deflect outer annular surfaces of the liner member against the inclined edges of the said partition in the end limit of inward movement of the said plunger members within said body, and means outside of said body for actuating said plunger members.

GUSTAV C. DETLEFSEN.

REFERENCES CITED

The following references are of record in the file of this patent:

UNITED STATES PATENTS

| Number | Name | Date |
|---|---|---|
| 485,698 | Ketchum | Nov. 8, 1892 |
| 766,420 | Calley | Aug. 2, 1904 |
| 788,510 | Bennett | May 2, 1905 |
| 1,683,322 | Annis | Sept. 4, 1928 |
| 1,879,631 | Mott | Sept. 27, 1932 |
| 1,931,320 | Haushatter | Oct. 17, 1933 |
| 1,954,903 | Walker | Apr. 17, 1934 |
| 2,033,941 | Kryzananowsky | Mar. 17, 1936 |
| 2,043,982 | Bruneau | June 16, 1936 |
| 2,301,439 | Moen | Nov. 10, 1942 |